United States Patent
Douglas

(10) Patent No.: US 7,377,206 B2
(45) Date of Patent: May 27, 2008

(54) PISTON FOR AN INTERNAL COMBUSTION ENGINE

(75) Inventor: Jonathan Douglas, Russellville, TN (US)

(73) Assignees: MAHLE Technology, Inc., Farmington Hills, MI (US); MAHLE International GmbH, Stuttgart (DE)

(*) Notice: Subject to any disclaimer, the term of this patent is extended or adjusted under 35 U.S.C. 154(b) by 210 days.

(21) Appl. No.: 11/320,080

(22) Filed: Dec. 28, 2005

(65) Prior Publication Data

US 2007/0144343 A1 Jun. 28, 2007

(51) Int. Cl.
*F16J 1/04* (2006.01)
(52) U.S. Cl. ........................................ 92/223
(58) Field of Classification Search ............... 92/223
See application file for complete search history.

(56) References Cited

U.S. PATENT DOCUMENTS

| | | | |
|---|---|---|---|
| 4,974,498 A * | 12/1990 | Lemelson | 92/223 |
| 5,314,717 A * | 5/1994 | Alt | 92/223 |
| 5,435,872 A * | 7/1995 | Penrice | 92/223 |
| 5,884,600 A * | 3/1999 | Wang et al. | 92/223 |

FOREIGN PATENT DOCUMENTS

WO    WO 2005/042953    10/2004

\* cited by examiner

*Primary Examiner*—F. Daniel Lopez
(74) *Attorney, Agent, or Firm*—Collard & Roe, P.C.

(57) ABSTRACT

A piston for an internal combustion engine, which performs a sliding reciprocating motion in a cylinder, and a method for producing the piston. The piston has a piston head and a piston skirt having at least one bearing surface. The at least one bearing surface is provided at least in part with a first overlay, and a second overlay is applied at least to parts of the first overlay. The first overlay exhibits greater wear resistance than the second overlay.

10 Claims, 2 Drawing Sheets

PISTON FOR AN INTERNAL COMBUSTION ENGINE

BACKGROUND OF THE INVENTION

1. Field of the Invention

The present invention relates to a piston for an internal combustion engine with a piston head and a piston skirt, which performs a sliding reciprocating motion in a cylinder, the piston skirt comprising at least one bearing surface. The present invention further relates to a method of producing such a piston.

2. The Prior Art

Known internal combustion engines for motor vehicles comprise, in addition to other components, an engine block with one or more cylinders and cylinder heads associated therewith together with pistons which perform reciprocating motion in the cylinders. The pistons comprise a piston head and an adjoining piston skirt. In the area of the piston skirt there is provided a bore for receiving a piston pin mounted therein, on which there is seated a connecting rod connected with a crankshaft.

Although the piston performs a straight downwards movement in the cylinder as a result of the combustion pressure exerted by the ignited petrol mixture or the diesel fuel, the piston is also subject at the same time to a sideways movement as a result of the circular motion of the connecting rod on the crankshaft and the clearance between the piston and the cylinder. During the reciprocating motion of the piston, this sideways movement causes friction to arise between the bearing surface of the piston skirt and the internal wall of the cylinder. In order to keep this friction between the piston and the cylinder resulting from the movement of metal on metal as low as possible, a lubricating film, e.g. oil, is produced between the bearing surface of the piston and the internal wall of the cylinder. At the elevated temperatures arising in an internal combustion engine, the lubricating film may rapidly lose its effect, resulting in inadequate lubrication and consequently impairment of the sliding properties of the piston.

This disadvantage has led to coating of the bearing surface of the piston skirt with an overlay which is abrasion resistant and exhibits a low coefficient of friction. It is additionally known to provide recesses or grooves in this overlay, in which additional lubricant, such as oil for example, may be introduced and collected. A known piston of this type is described in detail in international patent application WO 2005/042953 A2.

SUMMARY OF THE INVENTION

It is therefore an object of the present invention to provide a piston of the above-mentioned type exhibiting sliding properties, which ensure reliable low-friction functioning of the piston in the cylinder even at the elevated temperatures arising during operation over a long period.

This object is achieved with a piston for an internal combustion engine, with a piston head and a piston skirt, which performs a sliding reciprocating motion in a cylinder. The piston skirt comprises at least one bearing surface which is provided at least in part with a first overlay, to at least part of which a second overlay is applied. The first overlay exhibits greater wear resistance than the second overlay.

The method according to the invention for producing such a piston is distinguished by the following method steps:
a) mechanical cleaning of the bearing surface of the piston skirt,
b) chemical cleaning of the bearing surface of the piston skirt,
c) application of a first overlay over at least part of the bearing surface of the piston skirt,
d) application of a second overlay over at least part of the first overlay.

The piston according to the invention is distinguished by particularly advantageous sliding properties. The application of two overlays with different wear properties allows greater variation in the materials selected and in the layer thicknesses chosen for the individual overlays, such that the sliding properties of the piston according to the invention may be conformed to the requirements of each individual case and thus optimized. The application of two overlays with different wear properties makes it possible in particular to adapt the sliding properties of the piston according to the invention to the various phases during the service life thereof, which is only possible to a limited degree through purely structural design of the piston.

In particular, the sliding properties of the piston according to the invention during the running-in phase of the internal combustion engine or of the piston may be optimized. For example, through suitable selection of the layer thickness of the second overlay, the clearance between the bearing surface of the piston according to the invention and the internal wall of the cylinders may be reduced without impairing the sliding properties of the piston according to the invention in subsequent phases of its service life, because the second overlay is subject to wear after a given period of time (e.g. at the end of the running-in phase).

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
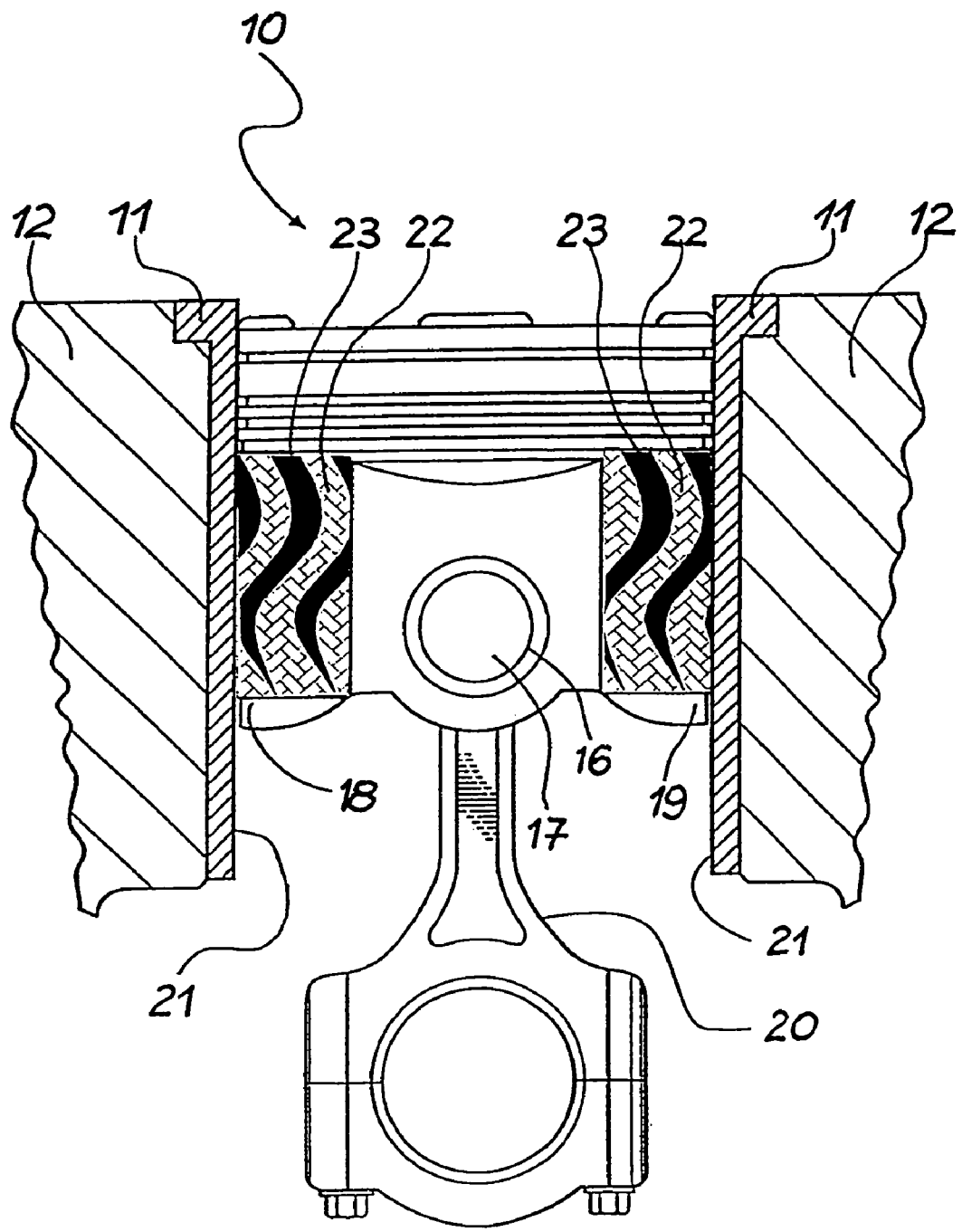
FIG. 1 is a partially sectional view of an engine block with a cylinder and a piston according to the invention performing reciprocating motion therein.
Figure 2:
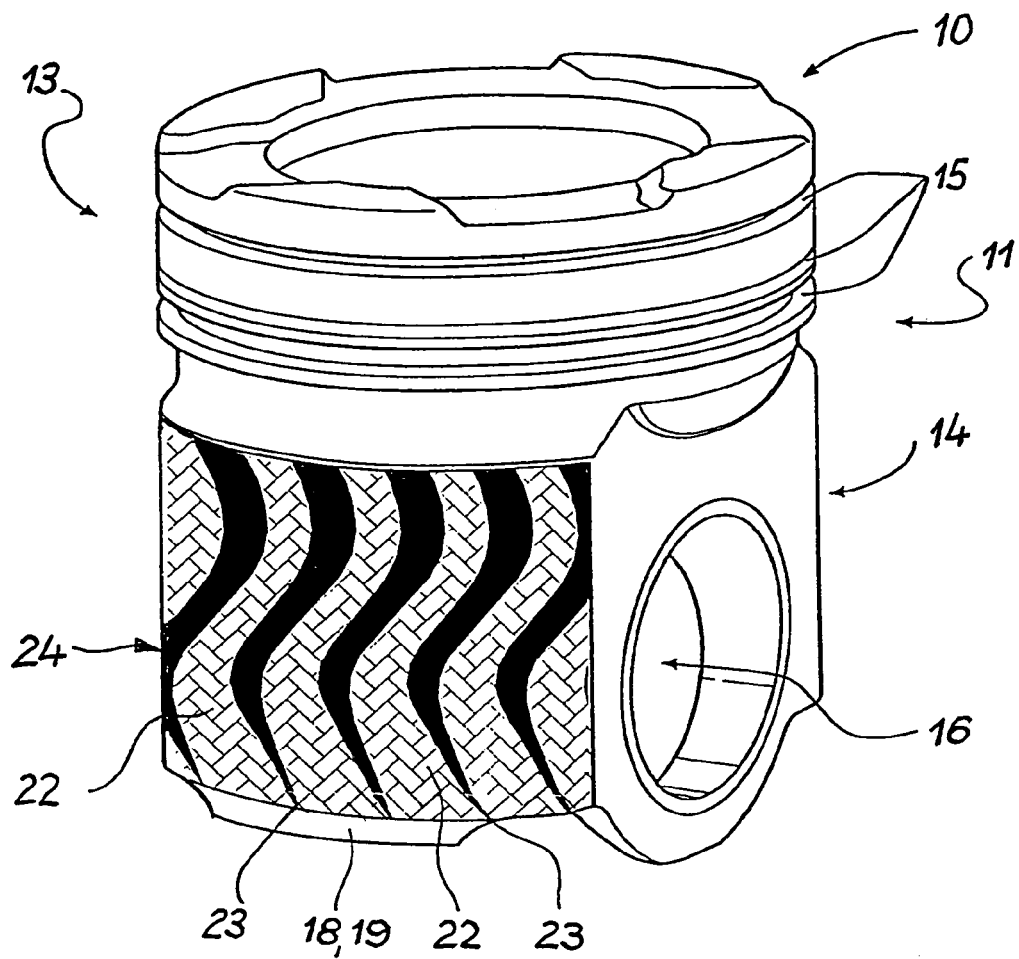
FIG. 2 is a perspective representation of a piston according to the invention as illustrated in FIG. 1.

Referring now in detail to the drawings, FIGS. 1 and 2 show an exemplary embodiment of a piston 10 according to the invention. The piston 10 is mounted reciprocatingly in a cylinder 11 of an engine block 12 of an internal combustion engine. Piston 10 comprises a piston head 13 and a piston skirt 14 axially adjacent thereto. Piston head 13 comprises ring grooves 15 located around the perimeter thereof for receiving piston rings (not shown). In the area of piston skirt 14 there is provided a bore 16 for receiving a piston pin 17. A connecting rod 20 is connected with piston pin 17 and with a crankshaft (not shown).

In the exemplary embodiment, piston skirt 14 comprises two mutually opposing bearing surfaces 18, 19, which slide along internal wall 21 of cylinder 11 during the reciprocating motion of piston 10. As a result of the circular motion of connecting rod 20 on the crankshaft and the clearance between bearing surfaces 18, 19 and internal wall 21 of the cylinder 11, piston 10 is subject to sideways movement, which causes friction to arise between bearing surfaces 18, 19 of piston skirt 14 and internal wall 21 of cylinder 11 during the reciprocating motion of piston 10 in cylinder 11.

Bearing surfaces 18, 19 are each provided with a first overlay 22. First overlay 22 preferably consists of a material with a Vickers hardness of 500 Hv to 4,000 Hv and a coefficient of friction of 0.05 to 0.15. Examples of suitable materials are Diamond-Like Carbon (DLC) coatings, Ceramic coatings, Thixotropic epoxy emulsions containing Graphite, Molybdnum, Polytetrafluoroethylene or combinations of each or combinations of each with metals (Fe, Ti, Ni, or other). The first overlay 22 may also consist of a solid lubricant with a range of parameters as follows. The layer thickness of the first overlay 22 amounts to 2 to 16 µm, preferably 5-10 µm. The first overlay 22 preferably covers bearing surfaces 18, 19 in their entirety, but it may also cover only parts of bearing surfaces 18, 19. The first overlay 22 may also consist of two or more individual layers. The individual layers may be made from the same material or different materials. Examples of suitable combinations of materials are Dow Corning Molykote D-10 and Dow Corning Molykote D-88. The layer thickness of each individual layer may amount to from 2 µm to 16 µm.

In the exemplary embodiment, first overlay 22 is hexagonal but may also be cubic, amorphous or other depending on the natural chemistry of the specific coating.

A second overlay 23 is applied to first overlay 22. In the exemplary embodiment, second overlay 23 is applied only to parts of first overlay 22. However, second overlay 23 may also cover the entirety of first overlay 22. Also, overlay 23 may cover sections of the bearing surface 18, 19 previously masked from overlay 22.

Second overlay 23 preferably consists of a solid lubricant with parameters listed as follows. The layer thickness of second overlay 23 amounts to 8 to 25 µm, preferably 12 to 15 µm. The layer thickness of second overlay 23 is preferably greater than the layer thickness of first overlay 22. Second overlay 23 may likewise consist of two or more individual layers. The individual layers may be made from the same material or different materials. Examples of suitable combinations of materials are epoxy emulsions containing graphite or molybdenum or polytetrafluoroethylene or combination of these or other. The layer thickness of each individual layer may amount to from 8 µm to 15 µm.

In the exemplary embodiment, second overlay 23 exhibits hexagonal structure (graphite) although others are possible.

Second overlay 23 is preferably applied onto first overlay 22 in the form of stripes, in the exemplary embodiment in the form of tiger stripes 24. However, second overlay 23 may also be applied to first overlay 22 in stripes of any other desired form, for example in the form of waves or rings or catenary geometry.

The piston according to the invention may be produced for example by performing mechanical cleaning (brushing, sandblasting etc.) and/or chemical cleaning (etching with acid and/or alkali) of the uncoated bearing surfaces 18, 19 and then applying each layer individually to the bearing surface and hardening it, depending on the material used. The layers may be applied for example by various printing methods (screen printing, rotary machine printing, pad printing etc.) or deposition methods (PVD, plasma, sputtering, ion beam, etc.)

In the exemplary embodiment piston 10 according to the invention was produced as follows:
1. Mechanical cleaning
2. Chemical cleaning
3. Screenprinting of thixotropic emulsion of graphite with Fe particles
4. Curing by heat
5. Chemical cleaning
6. Screenprinting of thixotropic emulsion of graphite, molybdnum, and PTFE
7. Curing by heat Accordingly, while only a few embodiments of the present invention have been shown and described, it is obvious that many changes and modifications may be made thereunto without departing from the spirit and scope of the invention.

What is claimed is:

1. A piston for an internal combustion engine, comprising:
a piston head;
a piston skirt comprising at least one bearing surface, the piston skirt performing a sliding reciprocating motion in a cylinder;
a first overlay on the at least one bearing surface, said first overlay comprising thixotropic epoxy emulsions containing graphite, molybdenum, polytetrafluoroethylene or combinations thereof or combinations thereof with metals; and
a second overlay applied at least to parts of the first overlay, said second overlay comprising epoxy emulsions containing graphite, molybdenum, polytetrafluoroethylene or combinations thereof, wherein the first overlay exhibits greater wear resistance than the second overlay.

2. A piston according to claim 1, wherein first overlay consists of two or more individual layers.

3. A piston according to claim 1, wherein the second overlay consists of two or more individual layers.

4. A piston according to claim 1, wherein the second overlay exhibits a greater layer thickness than the first overlay.

5. A piston according to claim 1, wherein the first overlay covers at least one bearing surface in its entirety and wherein the second overlay covers parts of the first overlay.

6. A piston according to claim 5, wherein the second overlay is applied onto the first overlay in the form of stripes.

7. A piston according to claim 5, wherein the second overlay is applied onto the first overlay in the form of wave-shaped stripes.

8. A piston according to claim 1, wherein the first overlay consists of a material with a coefficient of friction 0.05 to 0.15.

9. A piston according to claim 1, wherein the first overlay consists of a solid lubricant with a hardness of 500 -4,000 Hv.

10. A piston according to claim 1, wherein the first overlay consists of a solid lubricant with thickness of 2 to 16 µm.

* * * * *